March 28, 1967     A. A. VARELA     3,311,913
HEIGHT FINDING RADAR SYSTEM
Filed Oct. 21, 1952     2 Sheets-Sheet 1
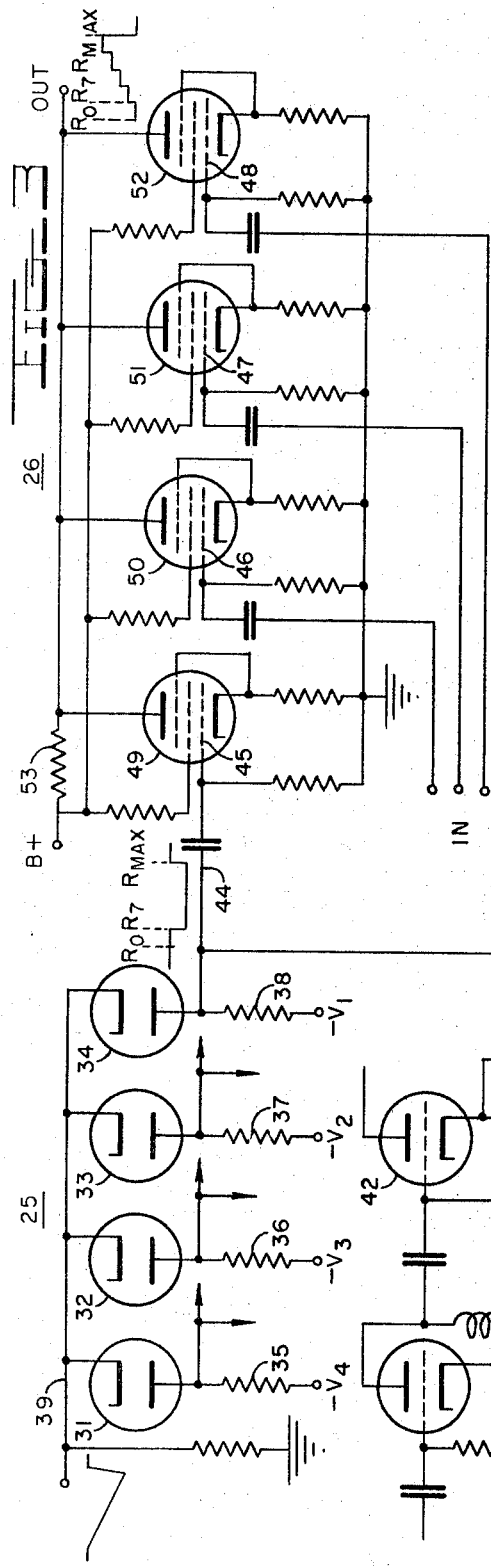
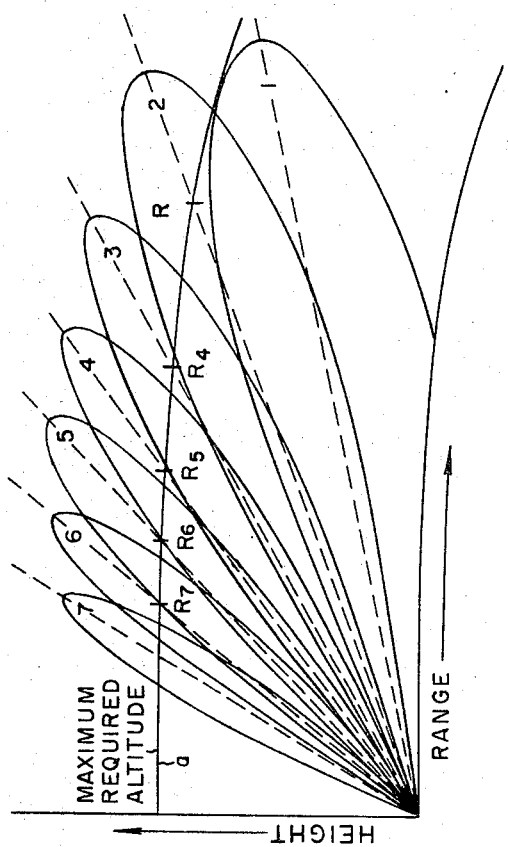
INVENTOR
ARTHUR A. VARELA
BY
ATTORNEYS

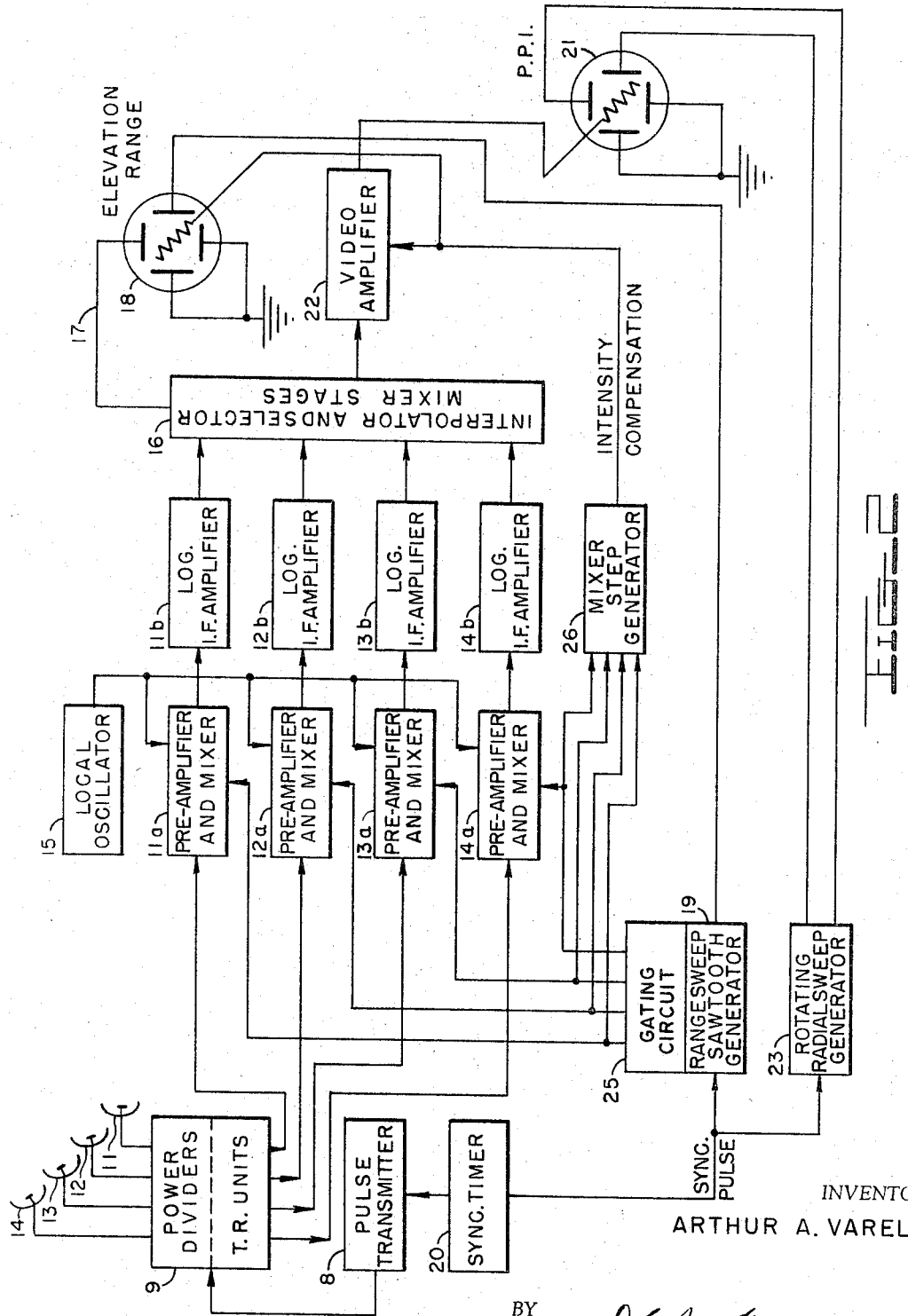

United States Patent Office 3,311,913
Patented Mar. 28, 1967

3,311,913
HEIGHT FINDING RADAR SYSTEM
Arthur A. Varela, Alexandria, Va. (Naval Research Laboratory, Anacostia Station, Washington, D.C. 20025)
Filed Oct. 21, 1952, Ser. No. 316,105
9 Claims. (Cl. 343—16)

The invention described herein may be manufactured and used by or for the Government of the United States of America for governmental purposes without the payment of any royalties thereon or therefor.

This invention relates to radio object detection systems of the multiple receiver type, and more specifically to improvements in the type of system disclosed in my copending application Serial No. 279,679, now abandoned, filed Mar. 31, 1952, for Height Finding Radar System.

In the above copending application there is described an object detection and locator system which is primarily directed to obtaining target elevation information through the use of vertically stacked antenna beams, each beam being associated with a directional receiving antenna. For each beam and antenna there is provided a detection and amplifying, or receiver, channel all of which feed a common selector mixer circuit. The selector determines which of the adjacent receiver channel pairs receives the greatest instantaneous reflected energy, and in conjunction with an interpolation circuit, resolves the received signals into range, azimuth, and elevational angle information.

Where a number of separate receivers, or receiver channels, are employed to feed a single utilization device, or signal translation device as in systems of the type alluded to above, the internal noise inherently generated by one receiver, combined with noise generated in the other receivers, presents a serious problem. This problem is particularly critical where the system is designed for long range target detection in which returned echo pulses from objects at long ranges are of a relative magnitude only slightly greater than the noise from a single receiver. In the copending application aforesaid this disadvantage is partially eliminated by the mixer being non-linear which takes advantage of the fact that the noise from the several receiver channels is independently random; the non-linear mixer presents in the output thereof the individual noise peaks rather than the sum.

While a non-linear mixing arrangement in the stacked beam system substantially reduces the loss in receiver sensitivity due to receiver noise, the combined receiver channel noise factor is still quite significant.

Accordingly, it is an object of the present invention to improve the receiver sensitivity in a stacked beam radio detection system.

Another object of the present invention is to limit, in a radio elevation angle locator system, the period of receiver response for high angles of reception whereby the receiver, or receiver section, will cease to contribute noise to the system during periods when useful information can be, or is being received only from lower angles of reception.

A further object of the present invention is to establish electronically, in a radio elevation angle indication system, a predetermined maximum altitude for echo reception above which the system is rendered insensitive.

Still another object of the present invention is to maintain automatically in a stacked beam radio locator system a substantially constant background intensity level on the cathode ray tube indicator thereof.

Other objects and advantages of the present invention will become apparent from the following description when taken in conjunction with the accompanying drawings in which:

FIGURE 1 represents the transmission field and reception pattern in elevation for the antennae and receiving channels in relation to a predefined maximum altitude.

FIGURE 2 is a block diagram of a stacked beam object detection system to which the present invention is applicable.

FIGURE 3 is a schematic diagram of the circuitry of the present invention as provided in the system shown in block in FIGURE 2.

In general, the transmission field pattern, or coverage, in the vertical plane of a long range radar system of the stacked beam type is determined within limits by the relative power fed to the individual beams. Obviously, it is desirous that the powed fed to the upper beams be limited to the amount which is sufficient to assure detection, or tracking of the smallest anticipated targets only up to the highest expected altitudes. Thus, the relative power fed to the individual radiating elements in the antenna array of the stacked beam system may be progressively decreased for the elements associated with progressively elevated beams, respectively, to obtain the progressively shorter range transmission beam patterns 1 to 7 as illustrated in FIGURE 1. To attain the optimum transmission power distribution, the decreasing range of the upper beam should preferably conform to the predetermined maximum altitude as previously described. In FIGURE 1 such maximum altitude, shown as a curved line in conformation with the curvature of the earth, is designated at $a$. In other words, since no real target signals are expected to be returned from above a given maximum altitude, progressively shorter maximum range, and hence, lower power apparatus is adequate to obtain effective coverage in the more elevated beams.

The beam pattern contours in FIGURE 1 are representative also of the directivity patterns of the system antennae array when energy is being received. The signal energy thus received may be resolved into range-elevation-azimuth information, as described in my copending application referred to above, by determining which pair of adjacent beams, 1–2, 2–3, 3–4, etc., receives the greatest instantaneous power and then interpolating between the selected beam pair the position of the target reflecting the received energy according to relative powers.

In the conventional manner the target information is applied to cathode ray tube indicators to provide separate visual indications of target range-elevation and target range-azimuth. In either case for a given azimuth, target echoes may be received from all the beams in one range sweep of the cathode ray tube beam and presented according to respective ranges. An examination of FIGURE 1, however, will show that the more elevated beams can provide useful information only during a limited portion of the total range sweep, that is, as compared with lower beams, the upper beams intercept the maximum altitude $a$ at shorter ranges, whereas the cathode ray indicator range sweep must at least be equivalent in range to the range of the lowermost beam. On the assumption that no targets can appear above altitude $a$, consider specifically beams 7 and 6. As described in my aforesaid copending application, the beams coact in adjacent pairs to provide elevation information. Clearly then, when the indicator cathode ray beam progresses to the intermediate point of the total range sweep corresponding to range $R_7$, the beam pair 7–6 has reached its limit of utility. For the remainder of the range sweep, the antenna and receiving channel associated with beam 7 can provide no useful information but may contribute spurious or false signals in addition to internally generated receiver noise to the combined receiving system output which results in a substantial reduction of the system sensitivity (minimum detectable signal, signal to noise ratio, tracking ability).

Similarly, after the range sweep has passed range $R_6$, beam pair 6-5 becomes undesirable as well as unnecessary, and likewise beam pair 5-4 at range $R_5$, beam pair 4-3 at range $R_4$, etc.

By sequentially blocking or attenuating the individual receiving channels, according to the maximum defined altitude, as the range sweep progresses, a significant increase in system sensitivity is obtained.

Referring now to FIGURE 2 there is shown a block diagram of a stacked beam locator system of the type described in my copending application referred to above, greater particularity being given those elements which are essential to the illustration of the present invention. It is to be understood, however, that the invention is not to be limited thereto. Further, FIGURE 2 illustrates four receiver channels in a four beam system, whereas in general, the number of channels is limited only by design considerations, a more practical number being seven as in FIGURE 1. As shown, the system includes a conventional pulse transmitter 8 which generates a series of spaced pulses to be directionally radiated into space. The pulsed output from pulse transmitter 8 is fed through conventional power dividers, generally designated in block at 9, to antennae 11, 12, 13 and 14, the relative power fed to the individual antennae being determined by the power dividers according to well-known practices whereby the desired transmission field distribution may be obtained. Antennae 11-14 may be of any suitable type, for example, the split paraboloid type, which provide directional beam characteristics wherein the beams may be stacked vertically with an overlap on adjacent beam patterns. Thus, the four antennae 11-14 may produce four of the beams illustrated in FIGURE 1, for example, beams 7, 6, 5 and 4.

Antennae 11-14 also serve as the system receiving array and are coupled through the usual T-R devices, also generally designated in block at as T-R units 9, to the system receiver, each antenna being associated with one of the separate receiver channels of the receiving system as alluded to above. Thus, signals received by the antennae 11-14 are respectively fed to the individual receiver channels, each channel including a preamplifier and mixer 11a, 12a, 13a or 14a, common local oscillator 15, logarithmic IF amplifier 11b, 12b, 13b or 14b, and interpolator and selector mixer stages 16. This latter stage includes a selector unit which compares the instantaneous signals delivered thereto by the various receiver channels to determine which pair of adjacent IF amplifiers 11b to 14b is supplying the greatest instantaneous output. Interpolator and selector mixer stages 16 also include apparatus for generating a pedestal pulse representing that pair. In addition, interpolator and selector mixer stages 16 provide for interpolating the pedestal pulse to produce a pulse of a magnitude proportional to target elevation angle. The interpolated pulses are fed by line 17 to the vertical deflection plates of cathode ray tube 18 to produce elevation angle indications, the horizontal plates of tube 18 being coupled in the usual manner to range sweep sawtooth generator 19 which is synchronized by synch pulses from the system synchronizer timer 20, all as described in the copending application aforesaid.

Stage 16 also provides in the selector circuit thereof a common output signal for each echo pulse received by the system. This signal may be utilized for intensity modulation of the intensity grid of a conventional plan position indicator (PPI) 21 after suitable amplification by video amplifier 22. Rotating radial sweep generator 23, connected to synchronizer timer 20, is provided for range deflection of the cathode ray beam of indicator 21 in the usual manner.

For the purpose of reducing the deleterious effect of the combined receiver noise on indicators 18 and 21, a gating circuit 25 is coupled to the various preamplifiers 11a-14a and provides for the blocking of the receiver channels sequentially, the blocking of individual channels occurring at the end of their respective utility periods as related to the range sweeps of the indicator beams. Gating circuit 25 may comprise a series of diode limiters, or pick-off tubes, coupled in parallel to the range sweep sawtooth generator 19, as will be described with more particularity in connection with FIGURE 3, for generating in time sequence a separate blocking voltage pulse for each receiver channel. That is, the output of the gating circuit 25 is a series of progressively shorter duration blocking pulses which, in relation to the initiation of the range sweep on indicators 18 and 21, respectively start at ranges $R_7$, $R_6$, $R_5$ and $R_4$, and fed to preamplifiers 11a, 12a, 13a and 14a for the sequential blocking thereof. Each blocking pulse is of sufficient duration to maintain the respective receiver channel disabled until the end of the range trace at which time all of the channels are restored, the process repeating following each synch pulse from the synchronizer timer 20.

Since by the inclusion of the gating circuit 25 the noise level at indicators 18 and 21 is caused to decrease with range, the noise background, or intensity, on the face of the cathode ray indicators also varies with range which may be objectionable. Intensity compensation may be had by adding, or mixing, the blocking pulses from gating circuit 25 at mixer step-voltage generator 26, to be described hereinafter, to produce a stepped bias voltage. This voltage is then applied to the intensity grid of indicator 21 through video amplifier 22 after combination with the video output of stage 16. The intensity level of PPI indicator 21 is thereby raised in steps, each step corresponding in time to an additional receiver channel being blocked.

FIGURE 3 illustrates one form gating circuit 25 and mixer step generator 26 may take. As shown, the former comprises a plurality of series-diode limiter circuits, the inputs to which are connected in parallel, which include series-diodes 31, 32, 33 and 34 having progressively varied negative bias voltages $-V_1$, $-V_2$, $-V_3$, and $-V_4$. Each diode has a load resistor 35, 36, 37 and 38 respectively connected to the plate thereof. The diode cathodes have a common coupling 39 to the range sweep sawtooth generator 19. Diodes 31-34 are shown to be successively responsive to a negative-going sawtooth wave derived from the range sweep generator 19. Of course, the diodes could be arranged for positive voltage limiting, but for reasons which will become apparent, this would require an inverter stage at the output of each diode circuit, obviously a less desirable alternative.

Bias voltages $V_1$ to $V_4$ are respectively of magnitudes, in relation to the cathode ray beam sawtooth deflection voltage output from range sweep sawtooth generator 19, such that diode 34 conducts when the sawtooth wave reaches the magnitude corresponding to range $R_7$ in FIGURE 1, diode 33 at range $R_6$, etc. The resultant negative pulses appearing across the diode plate resistors are then utilized for receiver channel blocking, for example, the pulse at resistor 38 is fed by line 54 to the bias control circuit, including resistor 40 and condenser 41, of conventional amplifier tube 42 in preamplifier 11a. In this connection, it is to be understood that while FIGURE 3 discloses series-diode limiters for generating a bias control pulse block the receiver channels, any means of time controlling the output thereof may be employed. Other apparatus suitable for this function may include a delay multivibrator or similar circuit for producing control pulses which may block the preamplifier as described, or activate an attenuator tube in the desired receiver channel.

To provide the stepped intensity compensation voltage, the negative blocking pulses from series diodes 31-34 are also fed to the respective control grids 45-48 of pentodes 49-52, as by line 44. The pentode circuits comprise mixer step generator 26 and each includes the usual single unit amplifier circuit parameters except for a common plate resistor 53. In operation, the inherent characteristics of the pentode circuits assure that, within limits, the current flow in one of the tubes is independent of the plate voltage and thus independent of current flow through the others. Current flow in each tube, therefore, is dependent only upon the applied grid signal voltage with the result that the current flow through plate resistor 53, and hence, the voltage drop thereacross, will be proportional to the sum of the applied signal voltages. Again, the form of mixer step generator 26 shown in FIGURE 3 is by way of example only, many circuits being available in the art which are capable of performing this function.

As an alternative to mixer step generator 26 for providing intensity compensations, it will be recognized that the individual receivers can be provided with a variable gain control circuit, the gain of the unblocked channels being increased as additional channels are blocked.

In both FIGURES 2 and 3 all of the receiving channels are shown to receive a blocking pulse from gating circuit 25, thereby effecting range limiting on all of the associated beams. Obviously there is no advantage to be had in limiting range on the lowermost beam of the stacked beam system, and in some instances it may be desirable to maintain the lowermost pair of beams active during the entire range sweep. In general, however, in a long range system preferably all but the lowermost beam, beam No. 1 in FIGURE 1, are range limited as described.

As the stacked beam system requires at least two beams for height finding with the target between the centers thereof, when all but the lowermost beam have been deactivated, as at extreme ranges, no true height finding can be had. The system has, therefore, been reduced to the conventional PPI locator system. But even under this condition a rough indication of height is obtainable inasmuch as in long range systems, when the low beam extends beyond the horizon, the range at which a target is first detected is proportional to height. Thus the target may be tagged at a rough height indication until its range closes sufficiently to give reception on more than one beam.

While the principles of the present invention have been illustrated in connection with an object detection system of the type described in my copending application Ser. No. 279,679, primarily a vertically stacked beam system wherein the several beams are simultaneously presented, the above principles are applicable to any system that provides substantially continuous coverage in elevation angle for any given azimuth. For example, the present invention is advantageously applicable to long-range scanning systems in which vertical coverage, with or without height finding, is obtained by vertical scanning of one or more beams while scanning in azimuth. In such systems the loss in detection on the associated PPI indicator may be quite high due to the receiver noise superimposed on the indicated target signal when the beam is not directed at the target. Applying the principles of the present invention to this system, the time and hence, range, of receiver blocking, or cut-out, is controlled according to the beam scan position, the cut-out being set for minimum range at maximum beam elevation angle and at progressively longer ranges with decreasing elevation angle.

It should be readily apparent, therefore, that the embodiment disclosed in the drawings and preceding description, while a preferred form of the present invention, may be modified in many respects without departing from the spirit of the broadest aspects thereof.

What is claimed is:

1. In a radio echo detection system, receiving apparatus which includes a plurality of directional receiving antennae having respective response patterns progressively displaced in elevation angle, respective detector and amplifying channels for said antennae, channel blocking means operative after a predetermined period following a pulse from the system transmitter to block sequentially said channels in order from the channel associated with most elevated pattern.

2. In a radio object detection system, a pulse transmitter for radiating into space a series of spaced pulses, receiving means including a plurality of directional receiving antennae having respective beam patterns progressively displaced in elevation angle, respective detection and amplifying channels for said antennae, blocking voltage generating means responsive to a transmitter pulse to generate a series of progressively delayed blocking voltages, and means for respectively applying said voltages to said channels to block the same in order beginning with the channel associated with the most elevated beam.

3. A radio object detection system comprising a pulse transmitter for radiating into space a series of spaced pulses, receiving means including a plurality of directional receiving antennae having respective beam patterns progressively displaced in elevation angle, respective amplifying channels for said antennae, blocking voltage generating means responsive to individual transmitter pulses to generate a series of progressively delayed blocking voltages, means for respectively applying said voltages to said channels in order beginning with the channel associated with the most elevated beam, means for deriving object video signals from said antennae and amplifying channels, cathode ray tube means for visually presenting said video signals, and means for maintaining the noise input to said cathode ray tube means at a substantially constant level.

4. A radio object detection system comprising a pulse transmitter for radiating into space a series of spaced pulses, receiving means including a plurality of directional receiving antennae having respective beam patterns progressively displaced in elevation angle, respective detection and amplifying channels for said antennae, a cathode ray indicator coupled to said channels for visually presenting received object information, range deflection voltage generating means for said indicator, blocking voltage generating means responsive to said deflection voltage generating means to generate a series of progressively delayed blocking voltages, means for respectively applying said voltages to said channels, voltage summation means coupled to said blocking voltage generating means for providing a stepped output voltage, each step increase in voltage corresponding to the blocking of an additional one of said channels, and means operative in accordance with said step increases to raise the bias voltage in the intensity channel of said cathode ray indicator.

5. In a radio object detection system, a pulse transmitter for radiating into space a series of spaced pulses, receiving means including a plurality of directional receiving antennae having respective beam patterns progressively displaced in elevation angle, respective detection and amplifying channels for said antennae, a cathode ray indicator coupled to said channels for visually presenting received object information, range deflection voltage generating means for said indicator, respective series-diode stepped-biased limiters coupled in parallel to said voltage generating means for providing in each range deflection period a series of progressively delayed blocking voltages, and means responsive to said blocking voltages for successively blocking said channels beginning with the channel associated with the most elevated beam.

6. A receiver for a radio object detection system which includes a transmitter for radiating into space a series of spaced pulses, comprising a plurality of directional receiving antennae having respective beam patterns progressively displaced in elevation angle, respective detection and amplifying channels for said antennae, means for deriving object information video signals from said channels, video amplifier means including a negatively biased amplifier stage coupled to said channels, a cathode ray tube indicator coupled to said video amplifier means for visually presenting said object information, range deflection voltage generator means for said indicator operative in response to a transmitter pulse, respective series-diode stepped-biased limiters coupled in parallel to said voltage generating means for providing in each range deflection period a series of progressively delayed blocking pulses, means responsive to said blocking pulses for sequentially blocking said channels beginning with the channel associated with the most elevated beam, voltage summation means coupled to said limiters for providing a stepped output voltage, each step increase in voltage corresponding to the blocking of an additional one of said channels, and means applying said stepped voltage to said amplifier stage to raise in steps the bias thereof for maintaining substantially constant the noise level input to said cathode ray tube indicator.

7. In a radio object detection system, a directional receiving antenna array having a plurality of response patterns progressively displaced in elevation angle and adapted to receive energy from remote targets, receiver channel means for said array, a cathode ray indicator coupled to said receiver means for visually presenting received object information, indicator beam deflection means operative in response to a pulse from the system transmitter to cause the indicator beam to sweep a range trace, and blocking means operative as said range sweep progresses to progressively block the receiver channel response to said response patterns of decreasing elevation angle.

8. In a radio object detection system, a directional receiving antenna array having a plurality of response patterns progressively displaced in elevation angle and adapted to receive energy from remote targets, receiver channel means for said array, a cathode ray indicator coupled to said receiver means for visually presenting received object information, indicator beam deflection means operative in response to a pulse from the system transmitter to cause the indicator beam to sweep a range trace, means operative as said range sweep progresses to progressively block the receiver channel response to response patterns of decreasing elevation angle, and means for increasing the bias level on the intensity grid control of said indicator as said range sweep progresses.

9. In a radio object detection system, a directional receiving antenna array having a plurality of response patterns progressively displaced in elevation angle and adapted to receive energy from remote targets, respective receiver channels for detecting the target information in corresponding response patterns, a cathode ray indicator coupled to said receiver channels for visually presenting the detected target information, indicator beam deflection means operative in response to a pulse from the system transmitter to cause the indicator beam to sweep a range trace, and receiver channel blocking means for sequentially blocking said channels as said range sweep progresses.

References Cited by the Examiner
UNITED STATES PATENTS

| | | | |
|---|---|---|---|
| 2,433,332 | 12/1947 | Benioff | 343—11 |
| 2,480,829 | 9/1949 | Barrow | 343—11 |
| 2,486,391 | 11/1949 | Cunningham | 250—27 |
| 2,498,381 | 2/1950 | Smith | 343—17.1 |

CHESTER L. JUSTUS, *Primary Examiner.*

JACK H. LINSCOTT, NORMAN H. EVANS,
*Examiners.*

A. K. GEER, R. D. BENNETT, *Assistant Examiners.*